(12) United States Patent
Viviani et al.

(10) Patent No.: US 9,313,839 B2
(45) Date of Patent: Apr. 12, 2016

(54) LIGHT-EMITTING DIODE LIGHTING DEVICE HAVING MULTIPLE DRIVING STAGES AND LINE/LOAD REGULATION CONTROL

(71) Applicant: IML International, Grand Cayman (KY)

(72) Inventors: Alberto Giovanni Viviani, Mountain View, CA (US); Dimitry Goder, San Jose, CA (US); Chun Lu, San Jose, CA (US); Kai-Yun Cheng, Taipei (TW)

(73) Assignee: IML International, Grand Cayman (KY)

( * ) Notice: Subject to any disclaimer, the term of this patent is extended or adjusted under 35 U.S.C. 154(b) by 0 days.

(21) Appl. No.: 14/660,950

(22) Filed: Mar. 18, 2015

(65) Prior Publication Data

US 2016/0007416 A1    Jan. 7, 2016

Related U.S. Application Data

(60) Provisional application No. 61/020,410, filed on Jul. 3, 2014.

(51) Int. Cl.
*H05B 33/08* (2006.01)

(52) U.S. Cl.
CPC .................................. *H05B 33/0812* (2013.01)

(58) Field of Classification Search
None
See application file for complete search history.

(56) References Cited

U.S. PATENT DOCUMENTS

| | | | |
|---|---|---|---|
| 2010/0308739 A1* | 12/2010 | Shteynberg | H05B 33/083 315/193 |
| 2013/0026935 A1* | 1/2013 | Jong | H05B 33/0818 315/201 |
| 2013/0169160 A1* | 7/2013 | Kim | H05B 37/02 315/122 |

FOREIGN PATENT DOCUMENTS

| | | |
|---|---|---|
| JP | 2013179279 A | 9/2013 |
| JP | 2013179288 A | 9/2013 |
| JP | 201439004 A | 2/2014 |
| JP | 201493528 A | 5/2014 |

* cited by examiner

*Primary Examiner* — Douglas W Owens
*Assistant Examiner* — Dedei K Hammond
(74) *Attorney, Agent, or Firm* — Winston Hsu; Scott Margo

(57) ABSTRACT

An LED lighting device includes multiple luminescent devices driven by a rectified AC voltage. The multiple luminescent devices are turned on flexibly in a multi-stage driving scheme using multiple current controllers. The current settings of the two driving stages with the highest current level and the second highest current level are adjusted according to the variation in the rectified AC voltage $V_{AC}$ or according to the variation in the duty cycle of the luminance device due to the variation in the rectified AC voltage. The present invention can improve the line/load regulation of the LED lighting device when the rectified AC voltage somehow fluctuates between its upper bound and lower bound.

10 Claims, 6 Drawing Sheets

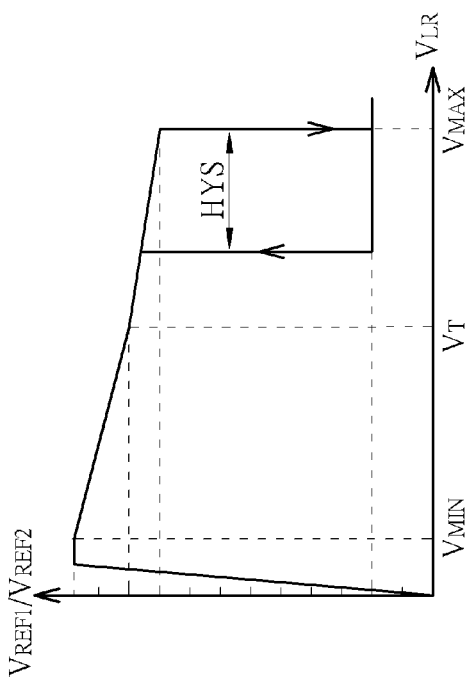
FIG. 3
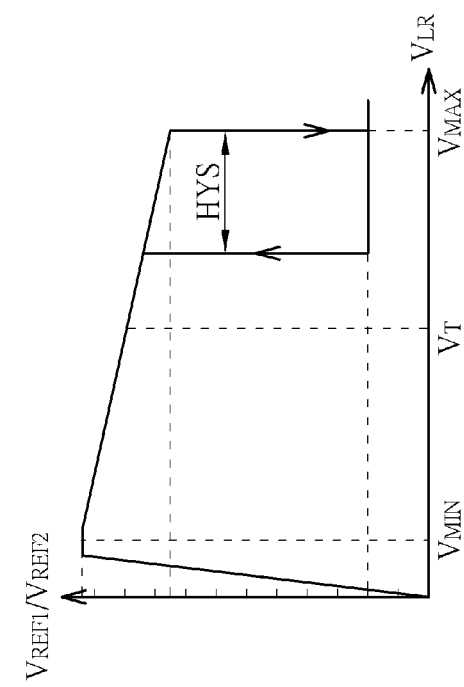
FIG. 5
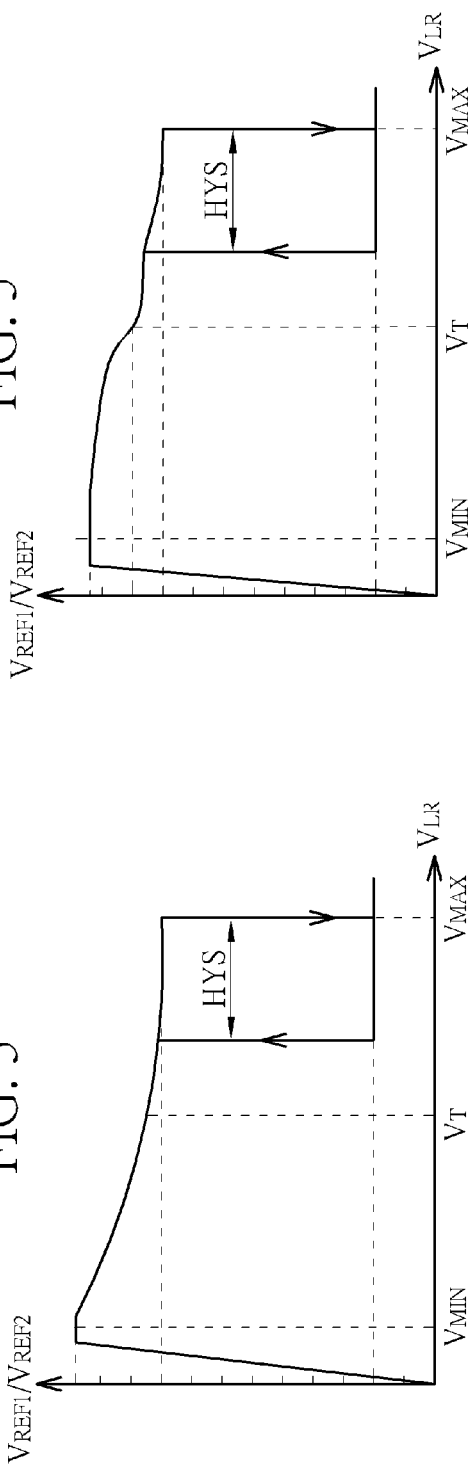
FIG. 4
FIG. 6

LIGHT-EMITTING DIODE LIGHTING DEVICE HAVING MULTIPLE DRIVING STAGES AND LINE/LOAD REGULATION CONTROL

CROSS REFERENCE TO RELATED APPLICATIONS

This application claims the benefit of U.S. provisional application No. 62/020,410 filed on 2014 Jul. 3.

BACKGROUND OF THE INVENTION

1. Field of the Invention

The present invention is related to an LED lighting device having multiple driving stages, and more particularly, to an LED lighting device having multiple driving stages for improving operational voltage range and line/load regulation.

2. Description of the Prior Art

An LED lighting device directly driven by a rectified alternative-current (AC) voltage usually adopts a plurality of LEDs coupled in series in order to provide required luminance. In a conventional method for driving an LED lighting device, the LEDs may be light up in stages in order to increase the effective operational voltage range. Line regulation is the ability of an LED lighting device to exhibit little change in brightness or power as the rectified AC voltage changes. Load regulation is the consistency in lamp-to-lamp brightness despite differences in the load voltage. Variations in line and load are similar in that a decrease in load voltage is effectively an increase in the rectified AC voltage (line voltage). Since the current is regulated independently in each stage of a prior art LED lighting device according the voltage established across each stage, the overall line/load regulation of the LED lighting device may not be able meet desired values. Therefore, there is a need for an LED lighting device capable of improving the effective operational voltage range and improving line/load regulation.

SUMMARY OF THE INVENTION

The present invention provides an LED lighting device having multiple driving stages. The LED lighting device includes a first luminescent device, a second luminescent device, a voltage detector, a first current controller, and a second current controller. The first luminescent device is driven by a rectified AC voltage for providing light according to first current. The second luminescent device is coupled in series to the first luminescent device and driven by the rectified AC voltage for providing light according to second current. The voltage detector is configured to monitor a variation in a peak level of the rectified AC voltage and generate a compensation voltage associated with the peak level of the rectified AC voltage. The first current controller is coupled in parallel with the first luminescent device and configured to regulate the first current so that the first current does not exceed a first current setting; and adjust the first current setting according to the compensation voltage. The second current controller is coupled in series to the second luminescent device and configured to regulate the second current so that the second current does not exceed a second current setting; and adjust the second current setting according to the compensation voltage.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 3-6 are diagrams illustrating the adjustment method performed by the LED lighting device according to embodiments of the present invention.

DETAILED DESCRIPTION

Figure 1:
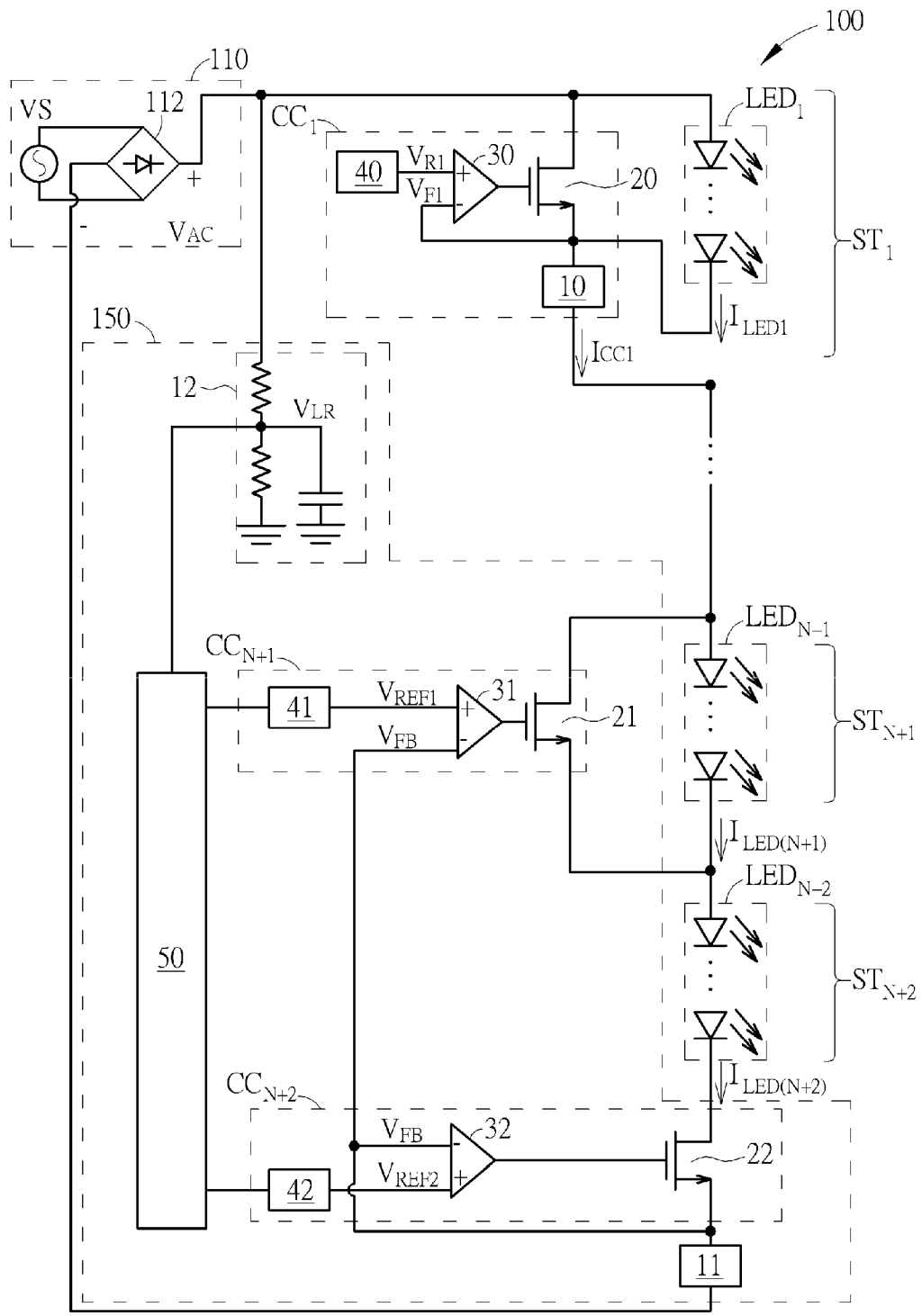
FIG. 1 is a diagram of an LED lighting device according to an embodiment of the present invention.
Figure 2:
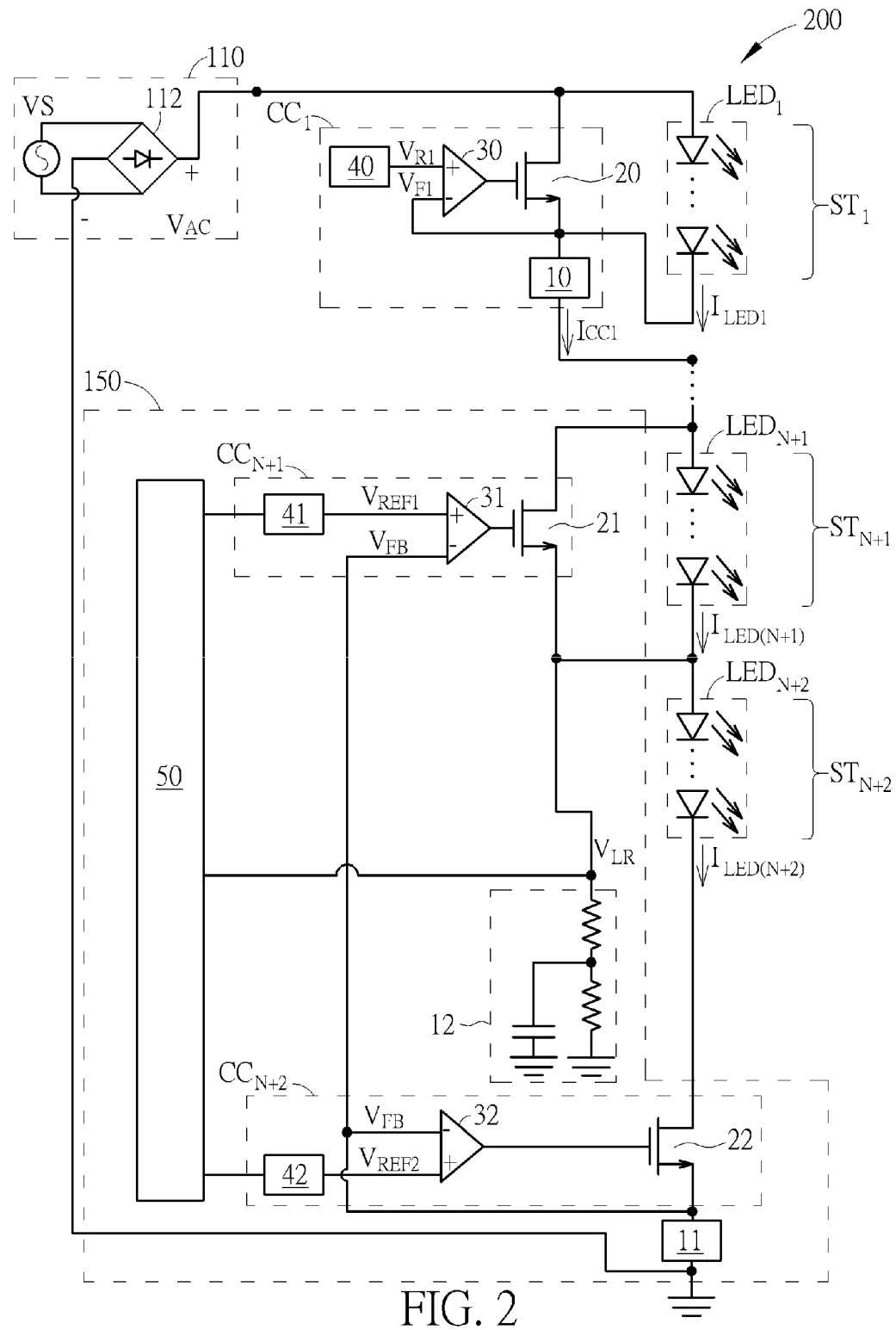
FIG. 2 is a diagram of an LED lighting device according to another embodiment of the present invention.

FIG. 1 is a diagram of an LED lighting device 100 according to an embodiment of the present invention. FIG. 2 is a diagram of an LED lighting device 200 according to another embodiment of the present invention. Each of the LED lighting device 100 and the LED lighting device 200 includes a power supply circuit 110 and (N+2) driving stages $ST_1$~$ST_{N+2}$ (N is a positive integer). The power supply circuit 110 is configured to receive an AC voltage VS having positive and negative periods and convert the output of the AC voltage VS in the negative period using a bridge rectifier 112, thereby providing a rectified AC voltage $V_{AC}$, whose value varies periodically with time, for driving the LED lighting devices 100 and 200. In another embodiment, the power supply circuit 110 may receive any AC voltage VS, perform voltage conversion using an AC-AC converter, and rectify the converted AC voltage VS using the bridge rectifier 112, thereby providing the rectified AC voltage $V_{AC}$ whose value varies periodically with time. However, the configuration of the power supply circuit 110 does not limit the scope of the present invention.

Each of the driving stages $ST_1$~$ST_{N+2}$ includes a luminescent device which is regulated by a corresponding current controller. $LED_1$~$LED_{N+2}$ represent the luminescent devices in the corresponding driving stages $ST_1$~$ST_{N+2}$, respectively. $CC_1$~$CC_N$ represent the current controllers in the corresponding driving stages $ST_1$~$ST_N$, respectively.

The driving stages $ST_1$~$ST_N$ are respectively controlled by the current controllers $CC_1$~$CC_N$ each having a constant current setting. Each of the current controllers $CC_1$~$CC_N$ includes a current detector 10, a switch 20, a comparator 30 and a reference voltage generator 40. The current detectors 10 of the current controllers $CC_1$~$CC_N$ are configured to detect the sum of the current flowing through the switches 20 of the current controllers $CC_1$~$CC_N$ and the luminescent devices $LED_1$~$LED_{N+2}$, respectively, thereby providing corresponding feedback voltages $V_{F1}$~$V_{FN}$. Each switch 20 may include a field effect transistor (FET), a bipolar junction transistor (BJT) or other devices having similar function. In FIGS. 1~2, an N-channel metal-oxide-semiconductor field effect transistor (N-MOSFET) is used for illustration, but does not limit the scope of the present invention. The reference voltage generators 40 of the current controllers $CC_1$~$CC_N$ are configured to provide constant reference voltages $V_{R1}$~$V_{RN}$ respectively. The values of the reference voltages $V_{R1}$~$V_{RN}$ determine the maximum current levels of the driving stages $ST_1$~$ST_N$, respectively. Each comparator 30 includes a positive input end coupled to the corresponding constant reference voltage, a negative input end coupled to the corresponding feedback voltage, and an output end coupled to the control end of the corresponding switch 20.

Each comparator 30 is configured to output a control signal according to the relationship between the corresponding reference voltage and the corresponding feedback voltage, thereby adjusting the current flowing through the corresponding switch 20. The operation of the driving stage $ST_1$ is used hereafter for illustrative purpose. When $V_{F1}$<$V_{R1}$, the comparator 30 in the current controller $CC_1$ is configured to raise the control signal for increasing the current flowing through the switch 20 until the feedback voltage $V_{F1}$ reaches the reference voltage $V_{R1}$. When $V_{F1}$>$V_{R1}$, the comparator 30 in the current controller $CC_1$ is configured to decrease the control signal for reducing the current flowing through the switch 20 until the feedback voltage $V_{F1}$ reaches the reference voltage $V_{R1}$. In other words, the current controllers $CC_1$~$CC_N$ provide constant current settings $I_{SET1}$~$I_{SETN}$ for the driving stages $ST_1$~$ST_N$, respectively, so that the current $I_{LED1}$~$I_{LEDN}$ flowing through the luminance devices $LED_1$~$LED_N$ does not exceeds respective current settings during the entire cycle of the rectified voltage $V_{AC}$.

In the LED lighting devices 100 and 200, the driving stages $ST_{N+1}$ and $ST_{N+2}$ are controlled by an adjustable current control unit 150 having adjustable current settings $I_{SET(N+1)}$ and $I_{SET(N+2)}$. The adjustable current control unit 150 includes a current detector 11, a voltage detector 12, a line/load regulation compensation control unit 50, a current controller $CC_{N+1}$ and a current controller $CC_{N+2}$.

The current detector 11 is configured to detect the overall current flowing through the switches 21 and 22, thereby providing a corresponding feedback voltage $V_{FB}$ which varies with the rectified AC voltage $V_{AC}$.

In the LED lighting device 100, the voltage detector 12 is coupled to the power supply circuit 110 and configured to detect the peak level of the rectified AC voltage $V_{AC}$, thereby providing a corresponding compensation voltage $V_{LR}$. In the LED lighting device 200, the voltage detector 12 is coupled to the luminescent device $LED_{N+2}$ and configured to detect the duty cycle of the luminescent device $LED_{N+2}$, thereby providing a corresponding compensation voltage $V_{LR}$. In the present invention, the voltage detector 12 may include one or multiple resistors, capacitors, other devices with similar functions, or any combination of above. However, the configuration of the voltage detector 12 does not limit the scope of the present invention.

The current controller $CC_{N+1}$ includes a switch 21, a comparator 31 and a reference voltage generator 41. The current controller $CC_{N+2}$ includes a switch 22, a comparator 32 and a reference voltage generator 42. The reference voltage generator 41 is configured to provide a reference voltage $V_{REF1}$ which is a function of the compensation voltage $V_{LR}$. The reference voltage generator 42 is configured to provide a reference voltage $V_{REF2}$ which is a function of the compensation voltage $V_{LR}$. The comparator 31 includes a positive input end coupled to the reference voltage $V_{REF1}$, a negative input end coupled to the feedback voltage $V_{FB}$, and an output end coupled to the control end of the switch 21. The comparator 32 includes a positive input end coupled to the reference voltage $V_{REF2}$, a negative input end coupled to the feedback voltage $V_{FB}$, and an output end coupled to the control end of the switch 22. The comparator 31 is configured to output a control signal to the switch 21 according to the relationship between the reference voltage $V_{REF1}$ and the feedback voltage $V_{FB}$, thereby adjusting the current flowing through the switch 21. The comparator 32 is configured to output a control signal to the switch 22 according to the relationship between the reference voltage $V_{REF2}$ and the feedback voltage $V_{FB}$, thereby adjusting the current flowing through the switch 22.

The line/load regulation compensation control unit 50 is configured to operate the reference voltage generator 41 of the current controller $CC_{N+1}$ and the reference voltage generator 42 of the current controller $CC_{N+2}$ according to the compensation voltage $V_{LR}$. The values of the reference voltages $V_{REF1}$~$V_{REF2}$ determine the maximum current levels of the driving stages $ST_{N+1}$~$ST_{N+2}$, respectively. In the present invention, the reference voltage $V_{REF1}$ and $V_{REF2}$ provided by the reference voltage generators 41-42 are adjusted to smaller values in response to a higher compensation voltage $V_{LR}$ and to larger values in response to a smaller compensation voltage $V_{LR}$.

FIGS. 3-6 are diagrams illustrating the adjustment method performed by the reference voltage generators 41-42 and the line/load regulation compensation control unit 50 according to embodiments of the present invention. The vertical axis represents the value of the reference voltage $V_{REF1}$ or $V_{REF2}$. The horizontal axis represents the value of the compensation voltage $V_{LR}$. For illustrative purpose, it is assumed that the effective operational range of the reference voltage generators 41-42 and the line/load regulation compensation control unit 50 is when the compensation voltage $V_{LR}$ is between a minimum value of $V_{MIN}$ and a maximum value of $V_{MAX}$. $V_T$ represents the value of the compensation voltage $V_{LR}$ when the rectified AC voltage $V_{AC}$ at its nominal bound.

In the embodiment depicted in FIG. 3, the line/load regulation compensation control unit 50 is configured to operate the reference voltage generators 41-42 in a way so that the variation of the reference voltage $V_{REF1}$ or $V_{REF2}$ is a linear function of the compensation voltage $V_{LR}$. A hysteresis region HYS may be adopted in order to avoid frequent reference voltage adjustment due to a small variation in the compensation voltage $V_{LR}$.

In the embodiment depicted in FIG. 4, the line/load regulation compensation control unit 50 is configured to operate the reference voltage generators 41-42 in a way so that the variation of the reference voltage $V_{REF1}$ or $V_{REF2}$ is a parabolic function of the compensation voltage $V_{LR}$. A hysteresis region HYS may be adopted in order to avoid frequent reference voltage adjustment due to a small variation in the compensation voltage $V_{LR}$.

In the embodiment depicted in FIG. 5, the line/load regulation compensation control unit 50 is configured to operate the reference voltage generators 41-42 in a way so that the reference voltage $V_{REF1}$ or $V_{REF2}$ vary with the compensation voltage $V_{LR}$ with different slopes. A hysteresis region HYS may be adopted in order to avoid frequent reference voltage adjustment due to a small variation in the compensation voltage $V_{LR}$.

In the embodiment depicted in FIG. 6, the line/load regulation compensation control unit 50 is configured to operate the reference voltage generators 41-42 in a way so that the variation of the reference voltage $V_{REF1}$ and $V_{REF2}$ is an arbitrary function of the compensation voltage $V_{LR}$ as long as the reference voltage $V_{REF1}$ or $V_{REF2}$ decreases as the compensation voltage $V_{LR}$ increases. A hysteresis region HYS may be adopted in order to avoid frequent reference voltage adjustment due to a small variation in the compensation voltage $V_{LR}$.

In the present invention, the line/load regulation compensation control unit 50 may operate the reference voltage generators 41-42 in any way as long as the reference voltage $V_{REF1}$ and $V_{REF2}$ can be adjusted to smaller values in response to a higher compensation voltage $V_{LR}$ and to larger values in response to a smaller compensation voltage $V_{LR}$. The voltage relationships depicted in FIGS. 3-6 are only for illustrative purpose, but do not limit the scope of the present invention.

Figure 7:
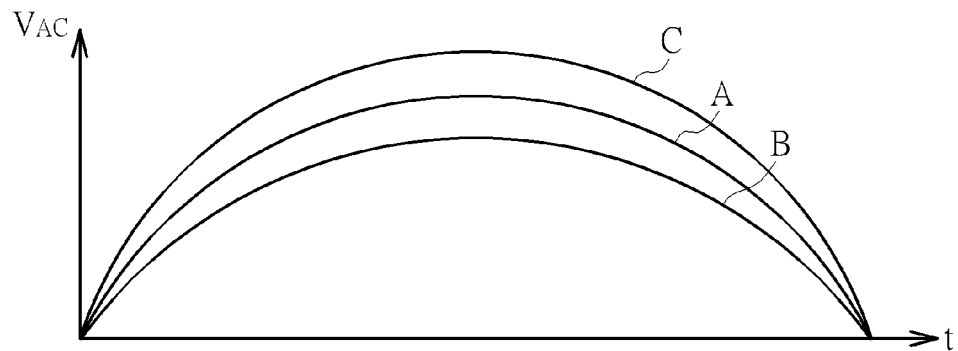
FIGS. 7-10 are diagrams illustrating the operation of the LED lighting device according to embodiments of the present invention.

FIGS. 7-10 are diagrams illustrating the operation of the LED lighting devices 100 and 200 according to embodiments of the present invention. The embodiment when N=1 is used for illustrative purpose. In FIG. 7, curve A represents the rectified AC voltage $V_{AC}$ at its nominal bound, curve B represents the rectified AC voltage $V_{AC}$ at its lower bound (which may be due to an increase in load voltage or a decrease in the AC voltage VS), and curve C represents the rectified AC voltage $V_{AC}$ at its upper bound (which may be due to a decrease in load voltage or an increase in the AC voltage VS).

Figure 8:
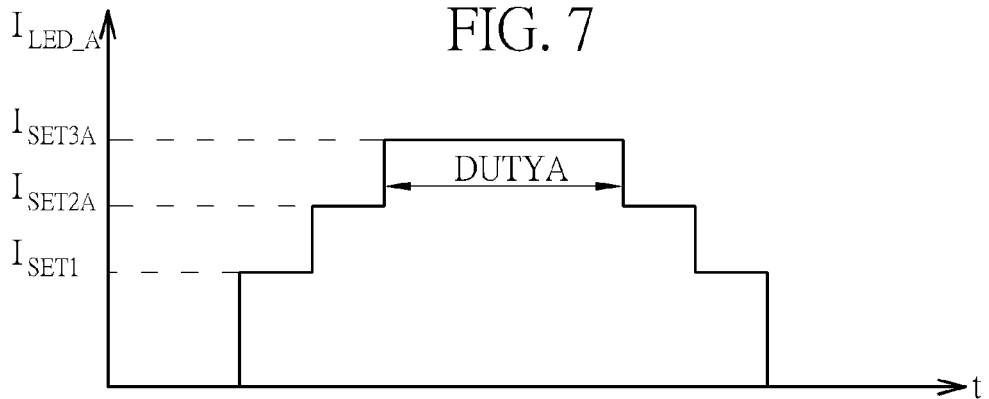

In FIG. 8, $I_{LED\_A}$ represents the overall current of the LED lighting device 100 or 200 when driven by the rectified AC voltage $V_{AC}$ at its nominal bound. The current controllers $CC_1$-$CC_3$ are configured to provide current settings $I_{SET1}$, $I_{SET2A}$ and $I_{SET3A}$, respectively for the driving stages $ST_1$-$ST_3$. The line/load regulation LR_A of the LED lighting device 100 or 200 when driven by the rectified AC voltage $V_{AC}$ at its nominal bound is indicated by the integral of the current $I_{LED\_A}$ over time t.

Figure 9:
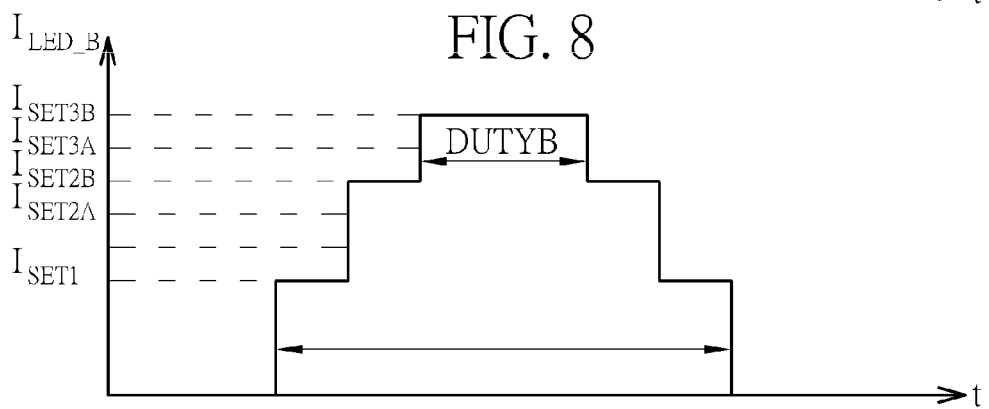

In FIG. 9, $I_{LED\_B}$ represents the overall current of the LED lighting device 100 or 200 when driven by the rectified AC voltage $V_{AC}$ at its lower bound. The current controllers $CC_1$-$C_{C3}$ are configured to provide current settings $I_{SET1}$, $I_{SET2B}$ and $I_{SET3B}$, respectively for the driving stages $ST_1$-$ST_3$. As previously stated, the voltage detector 12 of the LED lighting device 100 can directly monitor the variation in the peak level the rectified AC voltage $V_{AC}$, while the voltage detector 12 of the LED lighting device 200 can directly monitor the variation in the conducting duty cycle of the luminance device $LED_{N+2}$ due to variations in the rectified AC voltage $V_{AC}$. Therefore, the rectified AC voltage $V_{AC}$ at its lower bound results in a smaller compensation voltage $V_{LR}$, based on which the line/load regulation compensation control unit 50 instructs the reference voltage generators 41-42 to increase the reference voltage $V_{REF1}$ and $V_{REF2}$. More specifically, the adjustable current setting $I_{SET2B}$ is set to a value larger than the current setting $I_{SET2A}$, and the adjustable current setting $I_{SET3B}$ is set to a value larger than the current setting $I_{SET3A}$. The line/load regulation LR_B of the LED lighting device 100 or 200 when driven by the rectified AC voltage $V_{AC}$ at its lower bound is indicated by the integral of the current $I_{LED\_B}$ over time t. As can be seen in FIG. 9, when a decrease in the rectified AC voltage $V_{AC}$ shortens the conducting duty cycle of the LED lighting device 100 or 200, the present invention can increase the current settings of the two driving stages with the highest and the second highest current levels. As a result, the difference between the line/load regulation LR_A and the line/load regulation LR_B may be reduced.

Figure 10:
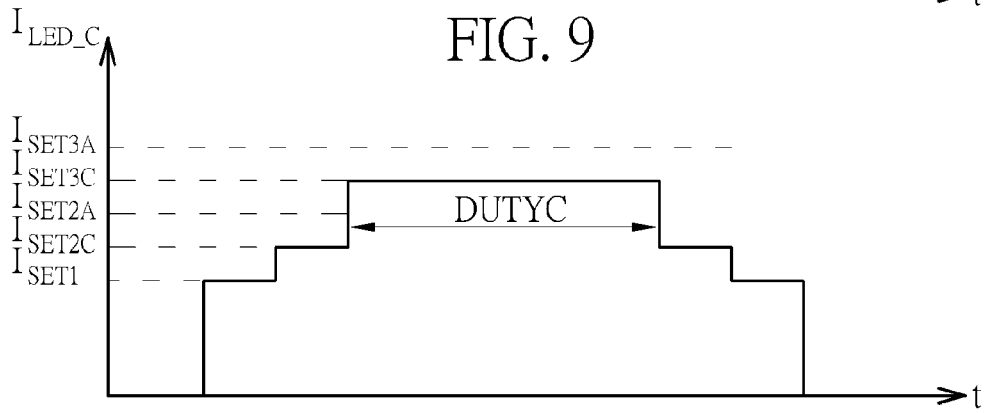

In FIG. 10, $I_{LED\_C}$ represents the overall current of the LED lighting device 100 or 200 when driven by the rectified AC voltage $V_{AC}$ at its upper bound. The current controllers $CC_1$-$CC_3$ are configured to provide current settings $I_{SET1}$, $I_{SET2C}$ and $I_{SET3C}$, respectively for the driving stages $ST_1$-$ST_3$. As previously stated, the voltage detector 12 of the LED lighting device 100 can directly monitor the variation in the peak level of the rectified AC voltage $V_{AC}$, while the voltage detector 12 of the LED lighting device 200 can directly monitor the variation in the conducting duty cycle of the luminance device $LED_{N+2}$ due to variations in the rectified AC voltage $V_{AC}$. Therefore, the rectified AC voltage $V_{AC}$ at its upper bound results in a larger compensation voltage $V_{LR}$, based on which the line/load regulation compensation control unit 50 instructs the reference voltage generators 41-42 to decrease the reference voltage $V_{REF1}$ and $V_{REF2}$. More specifically, the adjustable current setting $I_{SET2C}$ is set to a value smaller than the current setting $I_{SET2A}$, and the adjustable current setting $I_{SET3C}$ is set to a value smaller than the current setting $I_{SET3A}$. The line/load regulation LR_C of the LED lighting device 100 or 200 when driven by the rectified AC voltage $V_{AC}$ at its upper bound is indicated by the integral of the current $I_{LED\_C}$ over time t. As can be seen in FIG. 10, when an increase in the rectified AC voltage $V_{AC}$ increases the conducting duty cycle of the LED lighting device 100 or 200, the present invention can decrease the current settings of the two driving stages with the highest and the second highest current levels. As a result, the difference between the line/load regulation LR_A and the line/load regulation LR_C may be reduced.

As can be seen in FIGS. 8-10, the adjustable current control unit 150 allows the average value of the current $I_{LED\_A}$ (or the average integral of the current $I_{LED\_A}$ over time t), the average value of the current $I_{LED\_B}$ (or the average integral of the current $I_{LED\_B}$ over time t) and the average value of the current $I_{LED\_C}$ (or the average integral of the current $I_{LED\_C}$ over time t) to be as close to each other as possible. The value of the line/load regulation LR_A when the rectified AC voltage $V_{AC}$ at its nominal bound, the value of the line/load regulation LR_B when the rectified AC voltage $V_{AC}$ at its lower bound, and the value of the line/load regulation LR_C when the rectified AC voltage $V_{AC}$ at its upper bound may be as close to each other as possible, thereby improving the line/load regulation of the LED lighting device.

In the present invention, the switch 22 is required to have a higher durability (the ability to operating under thermal and/or electrical stress) than the switches 20 and 21. For example, the switch 22 may be a high-voltage transistor, while the switches 20 and 21 may be low-voltage transistors.

Figure 11:
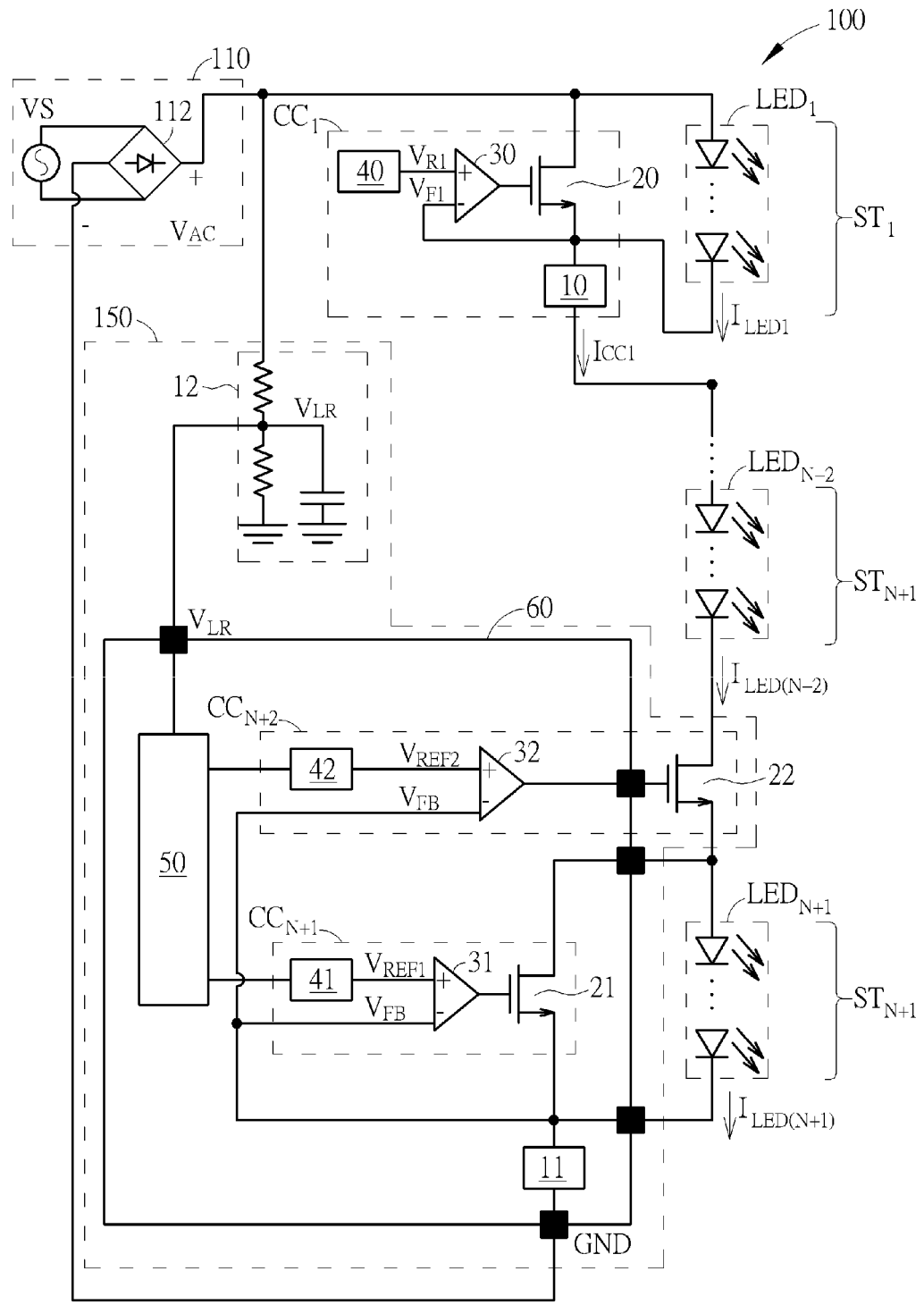
FIG. 11 is a diagram illustrating an embodiment of fabricating an LED lighting device according to the present invention.
Figure 12:
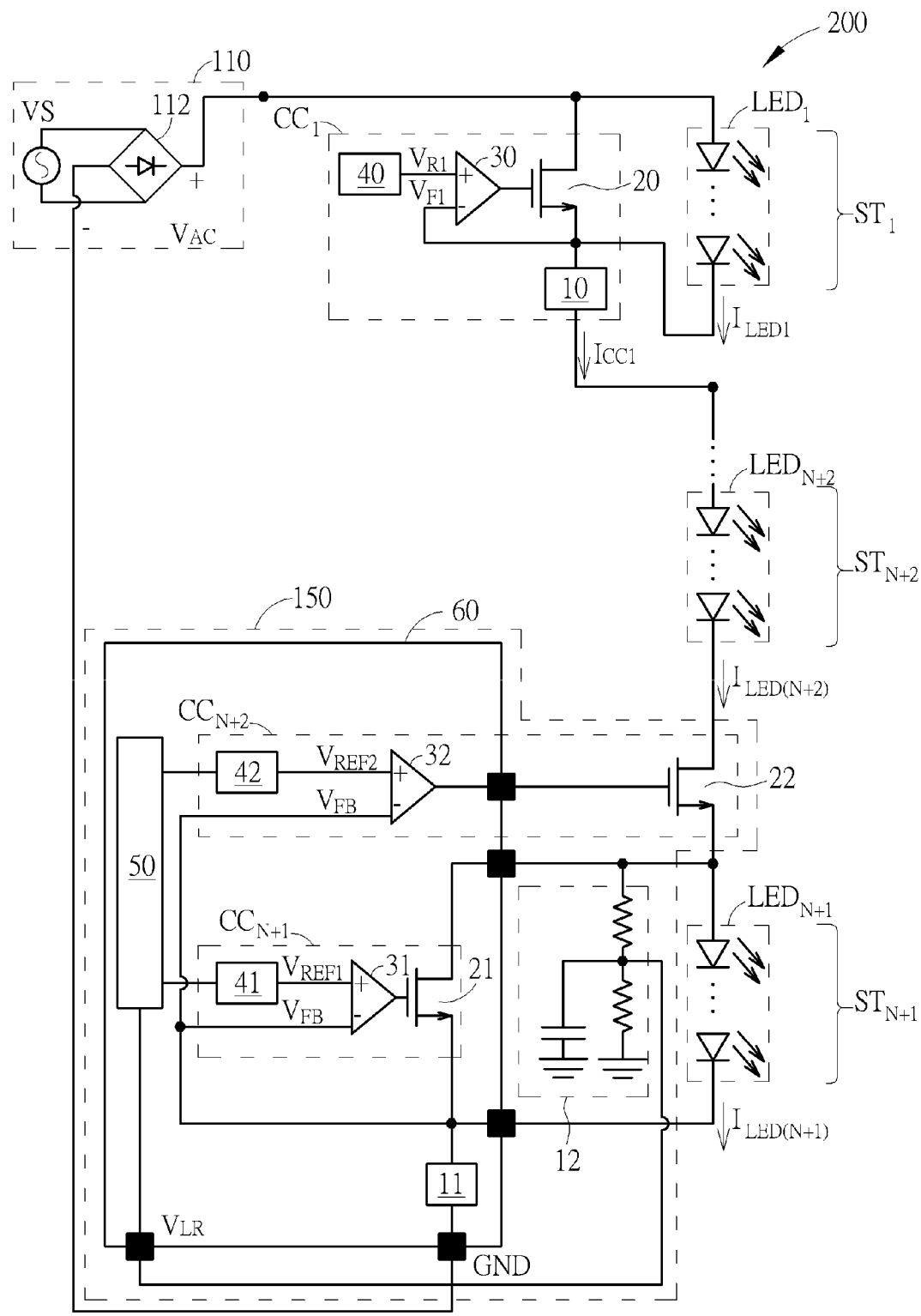
FIG. 12 is a diagram illustrating another embodiment of fabricating an LED lighting device according to the present invention.

FIG. 11 is a diagram illustrating an embodiment of fabricating the LED lighting device 100 according to the present invention. FIG. 12 is a diagram illustrating an embodiment of fabricating the LED lighting device 200 according to the present invention. The current detector 11, the switch 21, the comparators 31~32, the reference voltage generators 41~42, and the line/load regulation compensation control unit 50 may be integrated in the same chip 60. Since the switch 21 may adopt a low-voltage transistor, the chip 60 may be fabricated in a low-voltage process.

In the embodiments depicted in FIGS. 1~2 and 11~12, the driving stages $ST_1$~$ST_N$ are respectively controlled by the current controllers $CC_1$~$CC_N$ each having a constant current setting. In other embodiments of the present invention, the current controllers $CC_1$~$CC_N$ may be omitted.

The present invention may directly monitor the variation in the peak level the rectified AC voltage $V_{AC}$ or monitor the variation in the conducting duty cycle of the luminance device due to the variation in the rectified AC voltage $V_{AC}$, thereby adjusting the current settings of the two driving stages with the highest current level and the second highest current level accordingly. Even if the rectified AC voltage $V_{AC}$ somehow fluctuates between its upper bound and lower bound, the line/load regulation compensation control unit 50 and the reference voltage generators 41-42 may improve the line/load regulation of the LED lighting device.

With the above-mentioned multi-stage driving scheme with line/load regulation control, the present invention may improve the effective operational voltage range and line/load regulation of an LED lighting device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light-emitting diode (LED) lighting device having multiple driving stages, comprising:
a first luminescent device driven by a rectified alternative-current (AC) voltage for providing light according to first current;
a second luminescent device coupled in series to the first luminescent device and driven by the rectified AC voltage for providing light according to second current;
a voltage detector configured to monitor a variation in a peak level of the rectified AC voltage and generate a compensation voltage associated with the peak level of rectified AC voltage;
a first current controller coupled in parallel with the first luminescent device and configured to:
regulate the first current so that the first current does not exceed a first current setting; and
adjust the first current setting according to the compensation voltage; and
a second current controller coupled in series to the second luminescent device and configured to:
regulate the second current so that the second current does not exceed a second current setting; and
adjust the second current setting according to the compensation voltage.

2. The LED lighting device of claim 1, wherein:
the first current controller includes:
a first switch configured to conduct third current according to a first control signal;
a current detector configured to monitor a sum of the first current and the third current and provide a corresponding feedback voltage;
a first reference voltage generator configured to provide a first reference voltage associated with the first current setting and adjust the first reference voltage according to the compensation voltage; and
a first comparator configured to generate the first control signal according to a relationship between the first reference voltage and the feedback voltage; and
the second current controller includes:
a second switch configured to conduct the second current according to a second control signal;
a second reference voltage generator configured to provide a second reference voltage associated with the second current setting and adjust the second reference voltage according to the compensation voltage; and
a second comparator configured to generate the second control signal according to a relationship between the second reference voltage and the feedback voltage.

3. The LED lighting device of claim 2, wherein a durability of the second switch is higher than a durability of the first switch.

4. The LED lighting device of claim 2, further comprising a line/load regulation compensation control unit configured to operate the first reference voltage generator and the second reference voltage generator according to the compensation voltage so that the first reference voltage or the second reference voltage is adjusted to a first value when the compensation voltage is equal to a second value or is adjusted to a third value when the compensation voltage is equal to a fourth value, wherein the first value is larger than the third value and the second value is smaller than the fourth value.

5. The LED lighting device of claim 4, wherein the first switch, the first comparator, the first reference voltage generator, the second comparator, the second reference voltage generator and the line/load regulation compensation control unit are integrated into a same chip.

6. The LED lighting device of claim 1, further comprising a power supply circuit configured to provide the rectified AC voltage, wherein the voltage detector is coupled to the power supply circuit for detecting the peak level of the rectified AC voltage during each driving cycle.

7. The LED lighting device of claim 1, wherein the voltage detector is coupled to the second luminance device for detecting a variation in a conducting duty cycle of the second luminance device due to a variation in the rectified AC voltage.

8. The LED lighting device of claim 1, further comprising:
a third luminescent device coupled in series to the first and second luminescent devices and driven by the rectified AC voltage for providing light according to fourth current.

9. The LED lighting device of claim 8, wherein the third luminescent device is coupled between the rectified AC voltage and the first luminescent device.

10. The LED lighting device of claim 8, further comprising:
a third current controller coupled in parallel with the third luminescent device and configured to regulate the fourth current so that the fourth current does not exceed a third current setting, wherein the third current setting is a constant value.

UNITED STATES PATENT AND TRADEMARK OFFICE
CERTIFICATE OF CORRECTION

PATENT NO.     : 9,313,839 B2
APPLICATION NO. : 14/660950
DATED          : April 12, 2016
INVENTOR(S)    : Alberto Giovanni Viviani et al.

Page 1 of 1

It is certified that error appears in the above-identified patent and that said Letters Patent is hereby corrected as shown below:

On the title page, item (60), correct the provisional application number of the Related U.S. Application Data from "61/020,410" to --62/020,410--.

Signed and Sealed this
Fifth Day of July, 2016

Michelle K. Lee
*Director of the United States Patent and Trademark Office*